United States Patent
Lehnst et al.

(10) Patent No.: US 6,417,579 B1
(45) Date of Patent: Jul. 9, 2002

(54) ELECTRICAL SYSTEM WITH SECURITY BATTERY DISCONNECTION

(75) Inventors: Thomas Lehnst, Braunschweig; Uwe Müller, Isenbüttel; Thomas Marten, Wolfsburg; Uwe Dierker, Isenbüttel, all of (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 09/863,502

(22) Filed: May 23, 2001

Related U.S. Application Data

(63) Continuation of application No. PCT/EP99/08300, filed on Oct. 30, 1999.

(30) Foreign Application Priority Data

Nov. 27, 1998 (DE) .......................................... 198 54 953

(51) Int. Cl.$^7$ ................................................. H02H 7/18
(52) U.S. Cl. ..................... 307/10.7; 307/9.1; 307/10.6; 361/59; 180/282
(58) Field of Search ................................ 307/9.1, 10.7, 307/30, 38; 361/59, 64; 180/282, 283; 280/734, 735

(56) References Cited

U.S. PATENT DOCUMENTS

| | | | |
|---|---|---|---|
| 5,818,122 A | * 10/1998 | Miyazawa et al. | 307/10.7 |
| 6,127,741 A | * 10/2000 | Matsuda et al. | 307/36 |
| 6,171,121 B1 | 1/2001 | Krappel et al. | 439/158 |

FOREIGN PATENT DOCUMENTS

| | | |
|---|---|---|
| DE | 3841769 | 6/1990 |
| DE | 4028242 | 3/1992 |
| DE | 4402994 | 8/1995 |
| DE | 4425307 | 1/1996 |
| DE | 19606448 | 8/1997 |
| DE | 19854953 | 9/2000 |
| EP | 0632558 | 1/1995 |
| EP | 0825068 | 2/1998 |
| WO | 9423970 | 10/1994 |
| WO | 9633078 | 10/1996 |
| WO | 9731406 | 8/1997 |

OTHER PUBLICATIONS

English–language Abstract for EP 0825068.
English–language Abstract for DE 198 54 953.
English–language Abstract for DE 196 06 448.
English–language Abstract for DE 38 41 769.
English–language Abstract for DE 44 25 307.
English–language Abstract for DE 44 02 994.
English–language Abstract for DE 40 28 242.

\* cited by examiner

*Primary Examiner*—Josie Ballato
*Assistant Examiner*—Robert L. DeBeradinis
(74) *Attorney, Agent, or Firm*—Baker Botts LLP

(57) ABSTRACT

A starter circuit for a motor vehicle includes a circuit breaker responsive to a crash senor for disconnecting the starter circuit. A bypass switch is provided, which responds to a control circuit to provide power to the starter circuit following activation of the breaker, if the starter circuit is free of short circuits.

6 Claims, 2 Drawing Sheets

ELECTRICAL SYSTEM WITH SECURITY BATTERY DISCONNECTION

This application is a continuation of PCT/EP99/08300 filed Oct. 30, 1999, which was published in German as WO 00/32443.

BACKGROUND OF THE INVENTION

The invention relates to an electrical system for vehicles for vehicles having a combustion engine, a generator, a starter motor that can be manually activated, a starter battery and a breaker, controlled by a crash sensor and arranged in a starter circuit which includes the starter battery and the starter motor.

Electrical systems for vehicles are designed to prevent overheating and overload of wires caused by electrical short circuits in the event of a crash. For this purpose, most circuits are protected from short circuits by use of fuses and/or circuit breakers, except for the starter cable, i.e., the connection between the positive pole of the battery and the starter motor. Because of the high current of the starter motor, there is no suitable fuse for this cable.

EP 0 825 068, discloses a starter circuit which includes a breaker that interrupts the flow of current in response to a signal from a crash sensor, wherein the breaker immediately interrupts power to the starter cable in the event of a crash. The breaker may be constructed as a pyrotechnic device which triggers an explosion that interrupts the main path of the current. DE 196 06 448 and DE 44 02 994 respectively show a breaker of this type in the form of a battery terminal which is ordinarily actuated with the assistance of a pyrotechnical blasting cap in cooperation with an air bag sensor. For this purpose, the breaker is provided with two contact pieces whose contacting surfaces normally lie on top of each other and which may be separated from each other by pyrotechnical means, more specifically in the form of a propellant charge, when the vehicle undergoes an abnormally high acceleration. According to DE 44 25 307, the propellant charge may constitute a structural part of a battery terminal.

All of the prior approaches result in a permanent interruption of the starter circuit when a crash occurs. As a result, the vehicle cannot be started after the crash sensor has been triggered. This is particularly disadvantageous when the air bag sensor is triggered on account of a failure, or in a minor accident, when the driver would like to at least drive the car to the garage. In such a case, the vehicle can no longer be moved without repair.

An electrical system for vehicles is described in DE 40 28 242 wherein there is provided a second battery for supplying electrical accessories, in addition to a starter battery. The two batteries are connected together when the voltage of the electrical system battery is higher than the voltage of the starter battery. Conversely, when the voltage of the electrical system battery has dropped relative to the voltage of the starter battery, the two batteries are separated from each other. Accordingly, the generator is capable of recharging both batteries. In this solution, the second electrical accessory battery and the starter battery are permanently connected in parallel and the starter battery alone may be disconnected by a starter battery breaker in the starter circuit.

A diagram of connections for achieving an appropriate function in connection with the above mentioned reference is described in DE 38 41 769. WO 96133078 describes a battery terminal cooperating with a switch in the line leading to the battery, the switch being provided with monitoring means for controlling the switch in accordance with the signals received at its monitoring inputs.

It is the object of the present invention to make it possible to restart vehicles having a starter circuit breaker after response of the crash sensor and the irreversible interruption of the starter circuit in response thereto.

SUMMARY OF THE INVENTION

According to the invention, there is provided a bypass electrical switch which may be actuated by a control circuit, that is used in to detect whether there is a short circuit in the starter circuit, such that, after interruption of the starter circuit on account of a activation of a breaker, an electrical connection may be re-established between the starter and a battery in the starter circuit by the bypass switch, when the starter circuit is free from any short circuit.

A feature of the preferred embodiment of the invention is that a bypass-switch is arranged to re-connect the starter circuit when the control circuit senses that the starter circuit is free from any short circuit. Thus, the engine may be re-started when the mechanical damage occasioned by the crash is not so severe as to destroy the functionality of the starter. The energy source which is connected by the bypass switch to the starter circuit may be any available battery within the electrical system. The solution according to the invention is independent of the position of the breaker, which may also, e.g. be located in the ground cable of the starter battery.

According to a preferred embodiment of the invention, the bypass switch is preferably arranged parallel to the breaker, to thereby restore an electrical connection between the starter and the starter battery. The starter battery is therefore used for restarting the vehicle after the crash (as far as it has not been destroyed). The safety relevant function of the breaker is preserved in that the response of the breaker to the crash sensor prevents overload of the wires in the event of an accident, and on the other hand, the vehicle can be restarted when it is in running order. The electronics of the control circuit senses whether there is any short circuit in the starter wire and triggers the connection means when there is none.

In an alternative embodiment of the invention for electrical systems having a second battery, the bypass switch makes an electrical connection between the starter circuit and the second battery of the electrical system in the event the response of the breaker permanently interrupts the starter circuit. The energy source use for the starter thereby is the second battery of the electrical system, which ordinarily is not damaged in a frontal collision, as it may be located in the rear part of the vehicle. In this arrangement, the commutator that is already provided in such vehicles can function as the bypass switch when it is provided with a suitable control circuit for sensing short circuits in the starter circuit.

The invention will be more fully explained hereinafter with reference to two exemplary embodiments that are illustrated in the Figures.

DESCRIPTION OF THE INVENTION

Figure 1:
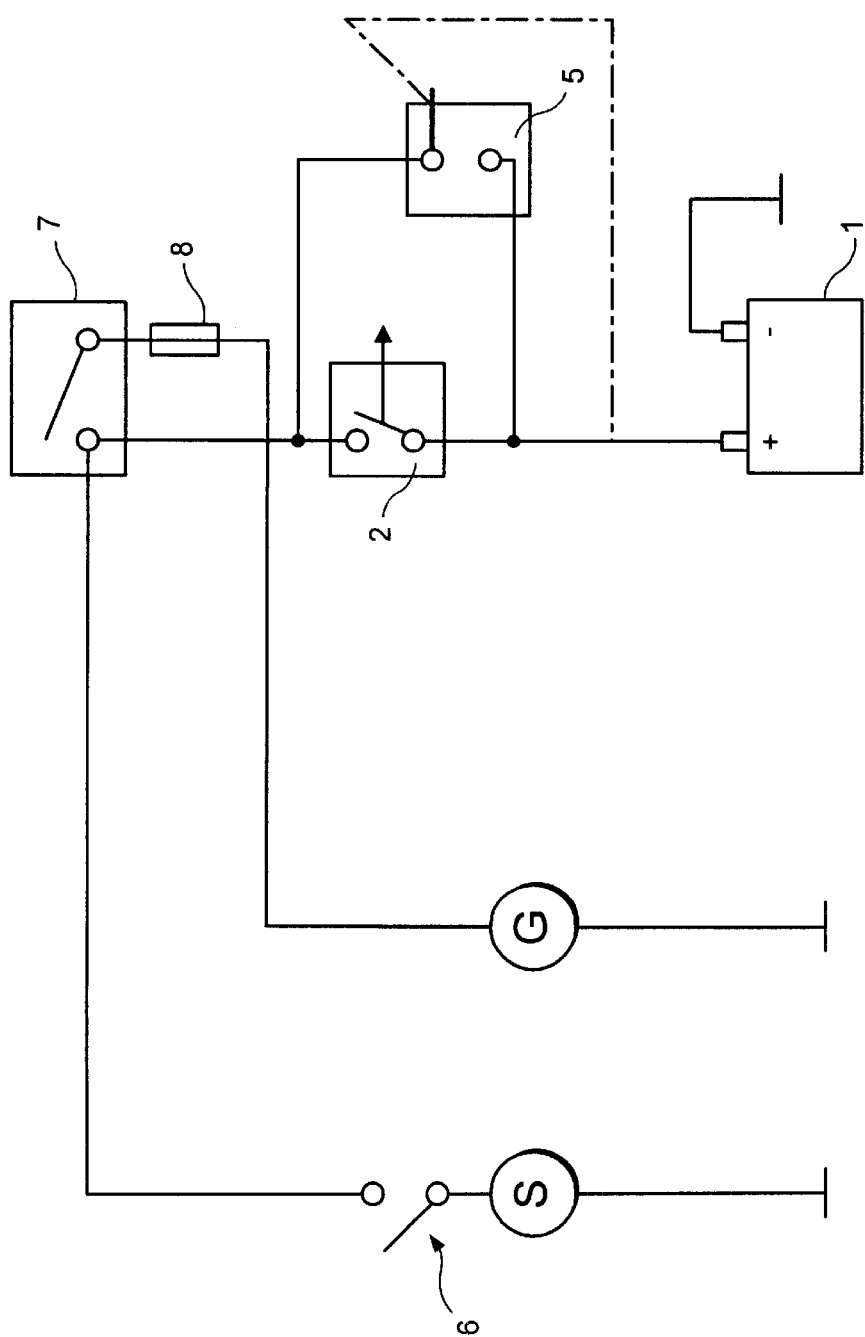
FIG. 1 is a block diagram of a first exemplary embodiment of the invention

According to a first exemplary embodiment of the invention, as illustrated in FIG. 1, an electrical system for a motor vehicle with a combustion engine includes a starter battery 1, with the negative terminal directly connected to the chassis as ground. The positive terminal of battery 1, is connected to a starter circuit, which activates a starter motor S. The starter circuit includes an operating switch 6, usually part of the ignition switch, and a breaker 2 which is coupled to a crash sensor, that causes the breaker 2 to open and interrupt the starter circuit in the event of a crash. Switch 6, which is usually a relay, is arranged to be operated to start the engine.

Normally, when switch 6 is closed, the starter S is supplied with energy by the starter battery 1, the breaker 2 being closed.

The electrical system is also provided with a generator G which is connected to switch 7 via a fuse 8, so that, during normal operation, switch 7 is closed and the starter battery 1 is charged by the generator G, the starter switch 6 being open.

A bypass switch 5 in the form of a electronically operated switch is arranged parallel to the breaker 2. Bypass-switch 5 is provided with a control circuit for checking whether there are any short circuits in the starter wire. For this purpose, the control input of the bypass switch 5 is connected to the connecting wire between the positive terminal of the battery 1 and the breaker 2.

In the event of a crash, the breaker 2 opens and irreversibly disconnects the starter battery 1 from the remaining electrical system so that the risk for the wires to overload is minimized.

If a vehicle, which is still in running order after the crash, is to be restarted, the detector means of the bypass switch 5 first senses, whether the starter wire is free from any short circuit. This can be achieved by making sure the positive terminal is at an appropriate voltage and that the wire leading to the starter motor is not connected to ground. If no short circuit condition is sensed, the switch 5 closes and the starter battery 1 can be connected to the positive terminal of the starter S through bypass switch 5 and starter switch 6. Thus, the vehicle can be driven at least to the garage where the damages occasioned by the crash may be repaired. Accordingly, the vehicle does not need to be towed away.

Figure 2:
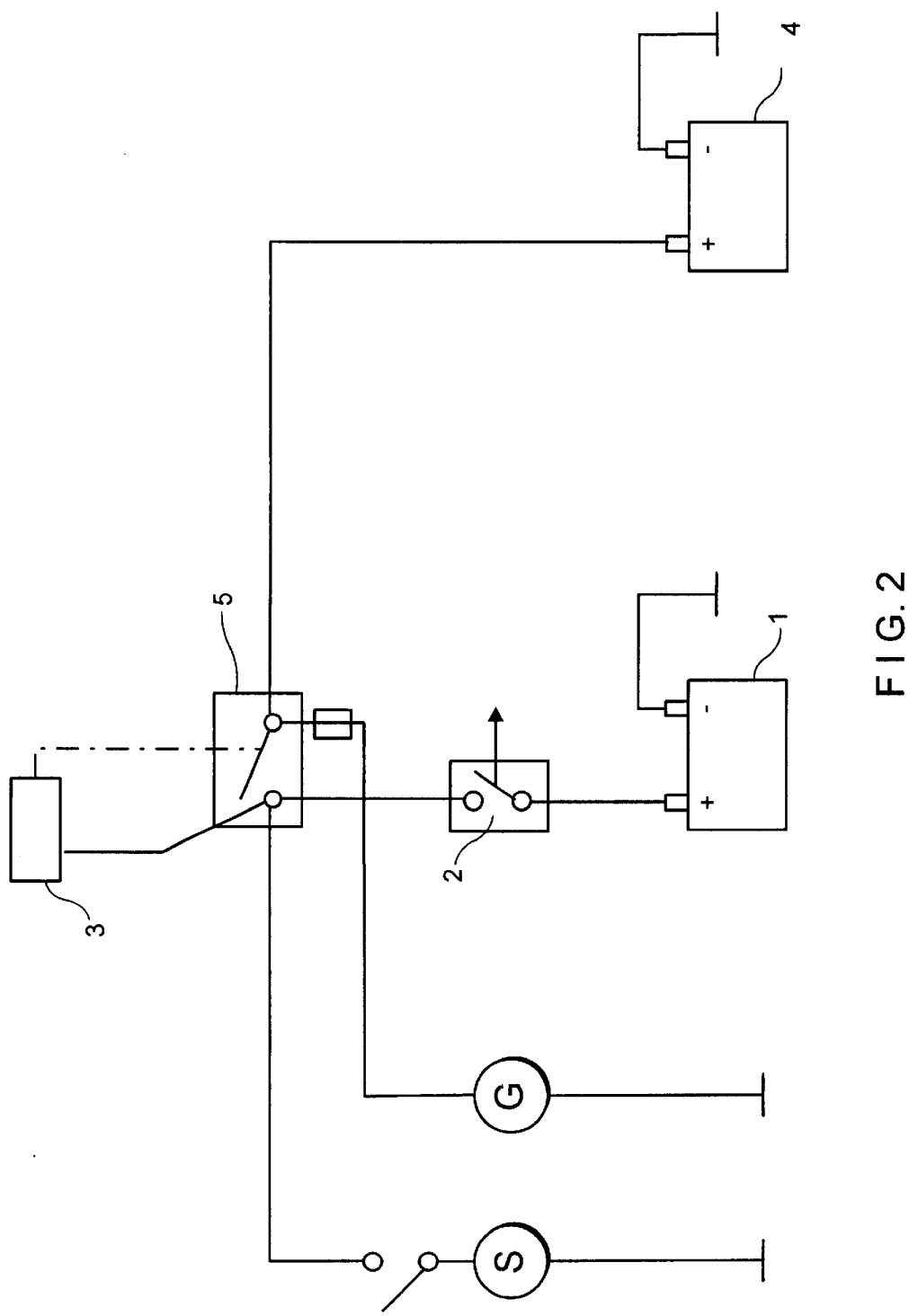
FIG. 2 is a block diagram of a second exemplary embodiment of the invention.

The second exemplary embodiment of the invention, shown in FIG. 2, differs from the first exemplary embodiment in that, in addition to the starter battery 1, a second battery 4 is provided that serves as a battery 4 for the electrical system and supplies current to accessories of an electrical system, which are not represented.

In this event, the bypass switch 5, which is designed as electrically operated switch, is connected between the second battery 4 of the electrical system and the starter circuit in such a way that, when a crash occurs and the breaker 2 irreversibly opens, the bypass switch 5 may be closed when the control circuit 3 associated with switch 5 senses that the starter circuit is free from any short circuit. Then, the second battery 4 of the electrical system is used for operating the starter motor S.

The control circuit 3 of the FIG. 2 embodiment may additionally sense whether there is a short circuit in the connection between the second battery 4 and the bypass switch 5. This further sensing cooperates with the power switch 5 in that it only allows the switch to close when the connecting wire of the electrical system between the battery 4 for the electrical system and the bypass switch 5 is also free from any short circuit.

While there have been described what are believed to be the preferred embodiments of the present invention, those skilled in the art will recognize that other and further changes and modifications may be made thereto without departing from the spirit of the invention and it is intended to claim all such changes and modifications as for within the true scope of the invention.

What is claimed is:

1. In a vehicle having a starter motor, a starter battery and a starter circuit for connecting said battery to said starter motor to start an engine, and wherein said starter circuit includes a circuit breaker responsive to a crash sensor for permanently interrupting said starter circuit, the improvement wherein there is provided a control circuit, operative when said circuit breaker interrupts said starter circuit and for determining if a short circuit exists in said starter circuit, and a bypass switch, responsive said control circuit when said control circuit determines that a short circuit does not exist, for re-establishing an starter connection between said starter circuit and a battery.

2. The improvement specified in claim 1 wherein said bypass switch is connected in parallel with said circuit breaker and is arranged to connect said starter circuit and said starter battery.

3. The improvement specified in claim 1 wherein said vehicle further includes a second battery in addition to said starter battery, for providing power to electrical accessories, said second battery being connected in parallel to said starter battery, and wherein said bypass switch connects said starter circuit to said second battery.

4. The improvement specified in claim 3 wherein said control circuit further determines whether there is a short circuit between said second battery and said bypass switch.

5. The improvement specified in claim 4 wherein said power switch is mounted with said circuit breaker on said starter battery.

6. The improvement specified in claim 1 wherein said bypass switch is a power switch.

* * * * *